(12) United States Patent
Peral et al.

(10) Patent No.: US 6,269,205 B1
(45) Date of Patent: Jul. 31, 2001

(54) OPTICAL DEVICES BASED ON ENERGY TRANSFER BETWEEN DIFFERENT MODES IN OPTICAL WAVEGUIDE

(75) Inventors: Eva Peral, Pasadena; Amnon Yariv, San Marino, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/326,197

(22) Filed: Jun. 4, 1999

Related U.S. Application Data

(60) Provisional application No. 60/088,121, filed on Jun. 4, 1998.

(51) Int. Cl.[7] ....................................................... G02B 6/26
(52) U.S. Cl. ............................... 385/28; 385/27; 385/15; 385/11; 385/37; 385/122
(58) Field of Search .................................. 385/15, 27, 28, 385/31, 37, 39, 42, 122, 11

(56) References Cited

U.S. PATENT DOCUMENTS

| | | |
|---|---|---|
| 5,093,876 | 3/1992 | Henry et al. ............................. 385/28 |
| 5,278,926 | 1/1994 | Doussiere ............................... 385/28 |
| 5,448,664 | 9/1995 | Zuev ...................................... 385/28 |
| 5,517,589 | 5/1996 | Takeuchi ................................ 385/24 |
| 5,524,156 | 6/1996 | Van Der Tol .......................... 385/28 |
| 5,903,683 | * 5/1999 | Lowry ................................ 385/28 X |
| 5,940,556 | * 8/1999 | Moslehi et al. ........................ 385/28 |
| 5,995,691 | * 11/1999 | Arai et al. ............................. 385/37 |
| 6,049,643 | * 4/2000 | Lee et al. ............................... 385/28 |

* cited by examiner

*Primary Examiner*—Brian Healy
(74) *Attorney, Agent, or Firm*—Fish & Richardson P.C.

(57) ABSTRACT

Optical waveguide devices based on optical coupling of different modes by using a mediating mode. Such waveguide devices generally have at least two coupling regions. The first coupling region couples an output mode and the mediating mode, and the second one couples the mediating mode and an input mode that copropagates with the output mode. Under proper conditions, the energy in the input mode can be completely transferred to the output mode, without energy loss to the mediating mode.

39 Claims, 3 Drawing Sheets

OPTICAL DEVICES BASED ON ENERGY TRANSFER BETWEEN DIFFERENT MODES IN OPTICAL WAVEGUIDE

This application claims the benefit of U.S. Provisional Application No. 60/088,121, pending, filed on Jun. 4, 1998.

TECHNICAL FIELD

The present specification relates to mode coupling in waveguides, and more particularly, to optical devices based on energy transfer between different waveguide modes.

BACKGROUND

An optical waveguide, such as an optical fiber or a dielectric slab waveguide formed on a substrate, can interact and confine optical energy in one or more waveguide modes depending on the design of the waveguide. A waveguide mode can be characterized by a number of mode parameters such as the spatial distribution of optical energy, the propagation constant, and the polarization state. Two different modes, either coexisting in the same waveguide or respectively residing in two separate waveguides, may couple with each other to exchange their energy under proper conditions. Such mode coupling can be used to perform various optical operations on guided optical waves. For example, devices like optical couplers and switches can be made by using waveguides.

Energy transfer from one optical wave to another co-propagating wave is desirable in many applications such as optical communication systems. Mode coupling between two co-propagating modes in a multimode waveguide may be used to achieve such operation. A periodic index perturbation that forms a grating along the waveguide can be used to couple the modes when the propagation constants of the two modes satisfy a Bragg-type condition. See, e.g., Yariv, *Optical Electronics*, Chapter 13, Saunders Publishing (1991).

For two co-propagating modes A and B to couple in a grating of a period Λ in the waveguide, the Bragg condition is:

$$\beta_A - \beta_B = \pm m \frac{2\pi}{\Lambda}, \text{ for } m = 1, 2, 3, \ldots \quad (1)$$

where $\beta_A$, $\beta_B$ are the propagation constants for modes A and B, respectively. The power conversion may be expressed by $$P_B(z) = P_B(0)\cos^2(\kappa z), \quad (2)$$

and $$P_A(z) = P_B(0)\sin(\kappa z), \quad (3)$$

where $P_B(0)$ is the power of the mode A before entering the grating and κ is the coupling coefficient κ between modes A and B in the grating. Hence, power exchange between modes A and B varies sinusoidally with κz. If the interaction length z is controlled at L=Π/(2κ) or its multiples, then the power of the mode B can be completely transferred into the mode A.

However, a precise control of the grating length for such phase matching is difficult in practical devices. This may be in part due to the unavoidable variations in manufacturing the grating in the waveguide and in part due to variations in the coupling parameter (κL) caused by environmental fluctuations during operation. In addition, since the desired coupling length L=Π/(2κ) usually has a strong dependence on both the wavelength and the polarization, the above coupling device may only operate in a narrow band and can be subject to degradation in performance caused by fluctuations in polarization. Furthermore, because the difference between the propagation constants of modes A and B is usually small, the required grating period $\Lambda = 2\Pi\text{m}/|\beta_A - \beta_B|$ is large. Hence, it is difficult to make this type of grating couplers compact.

SUMMARY

In recognition of the above, the present disclosure includes optical waveguide devices based on energy transfer between two copropagating modes via a third mediating mode by using one or more waveguides. The use of the third mediating mode can make the devices relatively insensitive to design parameters such as the coupling length and hence increase flexibility in device design. Other benefits include low insertion loss, reduced sensitivity to polarization, and operation at a narrow band an a broad band.

One embodiment of this type of waveguide devices includes a first optical terminal to receive optical energy in a first waveguide mode, a first wave-coupling region structured to couple at least a portion of the first waveguide mode into a second waveguide mode, a second wave-coupling region structured to couple the second waveguide mode into a third waveguide mode, and a second optical terminal coupled to the second wave-coupling region to output optical energy in the third waveguide mode. The second waveguide mode is different from the first and second waveguide modes. The first and third waveguide modes are copropagating with each other.

The two wave-coupling regions may be two different gratings formed in a single waveguide that is structured to support at least the first, second, and third waveguide modes. The waveguide includes a first grating and a second grating that work in combination to transfer energy between the copropagating first and third modes. The first grating is operable to couple one mode of the first and second modes into the other mode propagating in the opposite direction while being transmissive to the third mode and other modes. The second grating is operable to couple one mode of the second and third modes into the other mode propagating in the opposite direction while being transmissive to the first mode and other modes. The second grating is positioned relative to the first grating so that an optical wave in the second mode, if generated from one of the first and second gratings by converting a transmitted wave from the other grating, propagates towards at least a portion of the other grating to effect energy transfer between copropagating optical waves respectively in the first and third modes.

Three different waveguides may also be coupled to effect the first and the second coupling regions. One implementation uses a first waveguide structured to support the first waveguide mode and having an input as said first optical terminal, a second waveguide structured to support the second waveguide mode that copropagates with the first waveguide mode, and a third waveguide structured to support the third waveguide mode and having an output as the second optical terminal. The first waveguide has a segment close to a first portion of the second waveguide to allow evanescent coupling therebetween to form the first wave-coupling region. The third waveguide has a segment close to a second portion of the second waveguide to allow evanescent coupling therebetween to form the second wave-coupling region. The first and second portions in the second waveguide partially overlap each other and the first portion is closer to the second optical terminal than the second portion.

The first and third waveguides may be structured so that the first and third modes are phase matched to effect an efficient coupling in a wide range of wavelengths. A waveguide control may be implemented to control at least one of the first and the third waveguides to switch the device between a coupling state and a non-coupling state.

These and other aspects and associated advantages will become more apparent in light of the detailed description, the accompanying drawings, and the appended claims.

DETAILED DESCRIPTION

The present disclosure describes optical waveguide devices that couple two copropagating modes by using a mediating mode. Such waveguide devices generally have at least two coupling regions. The first coupling region couples energy between an input mode and the mediating mode. The second coupling region couples energy between the mediating mode and an output mode that copropagates with the input mode. Under proper conditions, the energy in the input mode can be completely transferred to the output mode, without substantial energy loss to the mediating mode. The use of the mediating mode can provide significant advantages over direct coupling between the input and output modes.

The coupling regions may use various coupling mechanisms to transfer energy between the modes. Depending on the coupling mechanism, the mediating mode may be either copropagating or counter-propagating with the input and output modes. For example, two reflective Bragg gratings can be used in the coupling regions within a single waveguide to provide the coupling and the mediating mode can counterpropagate with the input and output modes. When such a device uses three separate waveguides that are coupled by evanescent fields, the mediating mode can be copropagating with the input and output modes.

At least two modes of operation are possible. In an adiabatic mode of operation, the two coupling regions partially overlap with each other and their coupling coefficients have a gradual spatial change along the optical path of each coupled mode according to an adiabatic criterion. When properly configured, the mediating mode may not be fully excited, although it still mediates the energy transfer from the input mode into the output mode. Under adiabatic condition, only the input and output modes are required to be phase matched for efficient coupling. There can be a phase mismatch between the input mode and the mediating mode or between the output mode and the mediating mode, without affecting the coupling efficiency. This relaxed phase matching requirement may simplify the device design and fabrication.

In a non-adiabatic mode, the coupling coefficients of the two coupling regions have a rapid or abrupt spatial change along the optical path of at least one of the coupled modes, e.g., an abrupt transition between coupling and non-coupling regions. The two coupling regions may partially overlap or may be completely separated from each other. Two phase matching conditions are required to achieve efficient coupling between the input and output modes. First, the input mode and the mediating mode should be phase matched. Second, the mediating mode and the output mode should be matched. Hence, the mediating mode in this configuration is usually fully excited and travels from one coupling region to the other before it is converted into the output mode.

Figure 1:
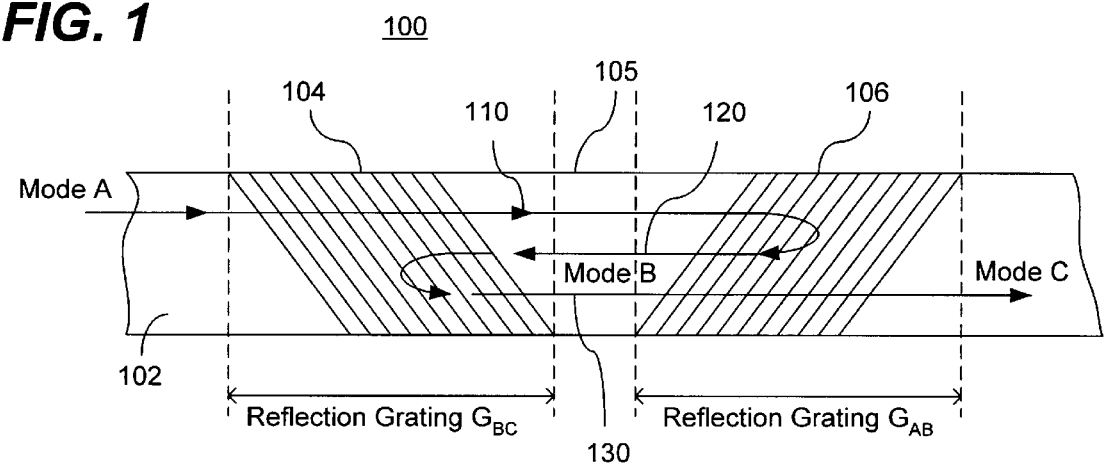
FIG. 1 shows one embodiment of a waveguide device formed in a single waveguide where two different reflective gratings for coupling two modes via a mediating mode.

FIG. 1 shows a waveguide device 100 in a single waveguide 102 which produces the mediating mode under the non-adiabatic condition. The waveguide 102 has a multimode structure that supports at least three optical modes: the input and output modes 110 (A), 130 (C), and the mediating mode 120 (B). Two different gratings 104 and 106 are fabricated in two separate regions along the waveguide 102. The index of refraction of the waveguide 102, for example, may be varied in a desired manner along the waveguide 102 to effect a grating.

The first grating 106 ($G_{AB}$) is structured to produce a Bragg phase-matching condition that only two counter-propagating waves that are in the input mode A and the mediating mode B, respectively, can satisfy. Hence, only modes A and B are perturbed by the grating 106 to transfer energy from one to the other. Optical waves in modes other than A and B, such as the output mode C, will transmit through the grating 106 unperturbed because they fail to satisfy the Bragg condition. The second grating 104 ($G_{BC}$) is designed for coupling phase-matched counter-propagating modes B and C and transmitting the input mode A and other modes.

Coupling between two counter propagating modes in a grating of a waveguide may be explained by a simplified model. See, Yariv, *Optical Electronics*, supra. For a grating with a period Λ, the Bragg condition for mode coupling between counter propagating modes A and B is:

$$\beta_B - \beta_A = m\frac{2\pi}{\Lambda}, \quad (4)$$

where $\beta_A$ and $\beta_B$ are the propagation constants for modes A and B, respectively, and m is a positive integer and represents the diffraction order of the grating. Referring to the device 100 in FIG. 1, the detunings for m=1 for the gratings 104 and 106 are:

$2\delta_{AB}=\beta_A+\beta_B-2\Pi/\Lambda_{AB}$, $2\delta_{CB}=\beta_C+\beta_B-2\Pi/\Lambda_{CB}$, respectively. When both gratings are phase matched, $\delta_{AB}\approx 0$ and $\delta_{CB}\approx 0$.

Under the phase matching condition (4), the power of the backward-propagating mode B is a hyperbolic function:

$P_B \tan h^2(\kappa z)$, (5)

where of κ is the coupling coefficient and z is the interaction length of the grating. Hence, the coupling efficiency monotonically increases with the interaction length z, rather than periodically oscillates with z as in the co-propagating coupling as indicated in Equations (2) and (3). Therefore, the interaction lengths of the gratings 104 and 106 need not be controlled accurately at some critical values during fabrication. Instead, the interaction lengths only need to be sufficiently long to achieve desired conversion efficiencies.

The coupling coefficient κ has a dependence on the polarization. Different polarizations may require different interaction lengths to achieve a certain conversion efficiency. Therefore, the strict requirement of κL=NΠ/2 (N=1, 2, 3, . . . ) for coupling two copropagating modes in a single grating makes it difficult to achieve efficient conversion at different polarizations. Using a grating to couple two counter propagating modes, however, can overcome the requirement of a critical interaction length by extending the interaction length of the grating to be sufficiently long so that conversion efficiencies at both polarizations in the waveguide reach to or exceed a desired value. As a result, the device 100 can be structured so that its operation is insensitive to polarizations.

The above simplified model further indicates that the grating period, $\Lambda=2\Pi m/(\beta_A+\beta_B)$, for coupling two counter-propagating modes, can be smaller by as much as about two orders of magnitude than that of a grating for coupling co-propagating modes ($\Lambda=2\Pi m/|\beta_A-\beta_B|$). Hence, each grating for coupling counter-propagating modes can be made more compact. This reduces the length of the waveguide device 100.

A more accurate theory for the mode coupling by the two gratings 104 and 106 in the waveguide device 100 involves analysis of a set of eigenmodes, i.e., "supermodes", in the perturbed multimode waveguide 102. See, Peral and Yariv, "Supermodes of Grating-Coupled Multimode Waveguides and Application to Mode Conversion between Co-Propagating Modes Mediated by Backward Bragg Scattering", *J. Lightwave Technol.*, Vol. 17(5), 942–947 (1999). However, the principle of operation can be illustrated by FIG. 1. The two gratings 104 and 106 are shown to be spatially displaced from each other. The second grating 104 for coupling oppositely traveling modes B and C is positioned on the left side of the first grating 106 that couples oppositely traveling modes B and A. This arrangement is to convert an input wave in the mode A from the left side of the waveguide 102 into an output wave in the mode C to the right side of the waveguide 102 or vice versa.

The coupling in each grating occurs only near a wavelength where the respective Bragg condition is satisfied. At the Bragg wavelength, modes A and B are phase-matched via the first grating 106, and modes B and C are phase-matched via the second grating 104. When mode A is incident from the left port of the waveguide 102, it travels forward through the grating 104, essentially unaffected by the grating 104. When the mode A reaches the grating 106, it interacts with the grating 106 and is reflected back into the mediating mode B. The mode B then travels backward and reaches the grating 104, where it is reflected back into the mode C. Mode C travels forward through the grating 106, unaffected, to emerge from the right port. If mode C were incident on the left port, it would be very strongly reflected by the grating 104. The device 100 is symmetric and thus, if mode C were incident on right port, it would be converted into mode A which emerges at the left port.

Figure 2:
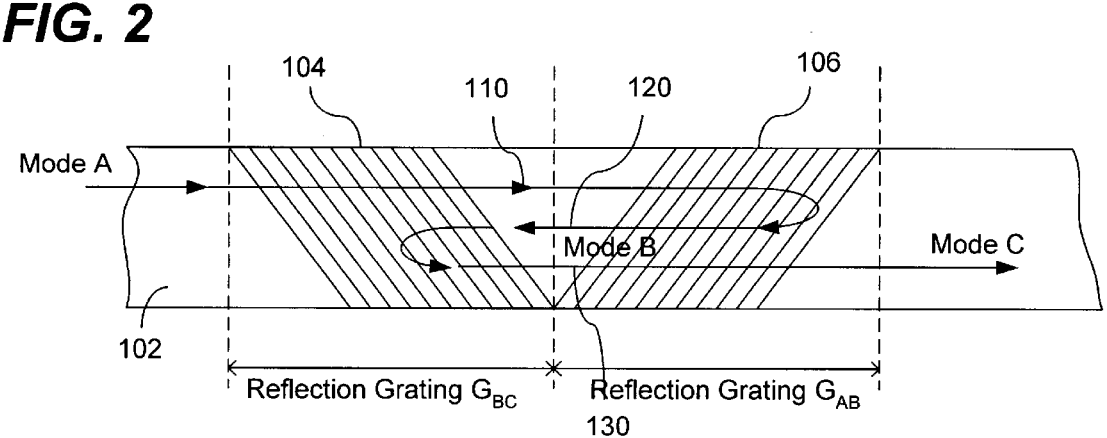
FIGS. 2 and 3 show two variations of the device of FIG. 1.

FIG. 1 shows two gratings 104 and 106 that are separated by a segment 105 of the waveguide 105. Other arrangements are also possible. FIG. 2 shows the two gratings 104 and 106 are immediate adjacent to each other in the waveguide 102. These two configurations are non-adiabatic configurations since two coupling regions have no spatial overlap. The conversion is highly efficient here since the energy in the input mode A is completely converted into the mediating mode B which is then converted into the output mode C.

Figure 3:
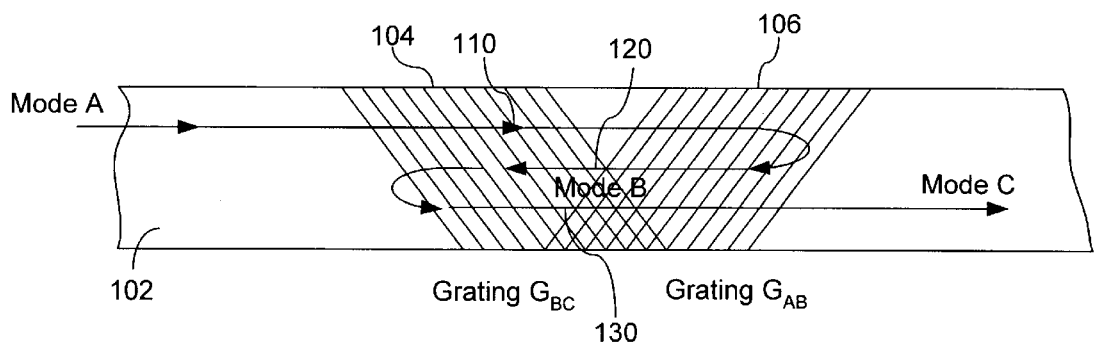

The two gratings 104 and 106 may also partially overlap with each other as shown in FIG. 3 to operate under either the non-adiabatic condition or the adiabatic condition. In the non-adiabatic condition, at least one grating has a coupling coefficient that changes rapidly along the waveguide 102. For example, this grating may have a substantially constant coupling coefficient and hence the coupling coefficient suddenly drops to zero at the end of the grating. Depending on the degree of the spatial overlap, the energy in the mode A may not be completely converted into the mode C.

The waveguide device of FIG. 3 may also operate in the adiabatic configuration to provide efficient coupling by phase matching the modes A and C. The phase matching condition between modes A and C is $\delta_C=-2(\delta_{AB}-\delta_{CB})\approx 0$, which is determined by the propagation constants of modes A, B, C, and the grating periods of gratings 104 and 106. Hence, as long as gratings 104 and 106 satisfy $\delta_{AB}\approx\delta_{CB}$, phase matching between modes A and B ($\delta_{AB}\approx 0$) and between B and C ($\delta_{CB}\approx 0$) may not be required. In addition, it is required that the coupling coefficients vary slowly enough that an adiabaticity condition is satisfied. The input forward-propagating mode A is converted into mode C without substantial energy loss, and the mediating mode B is almost not excited. As long as adiabaticity is fulfilled, the energy transfer is essentially independent of the strength and spatial profile of the coupling coefficients of the partially-overlapping gratings 104 and 106. Therefore, the two gratings 104 and 106 may be made of a variety of forms to simplify their fabrication or to be designed to have certain desired properties to meet the needs of specific applications. For example, due to this flexibility in fabrication, waveguide devices with small insertion loss can be easily obtained. In addition, if the coupling coefficient is strong enough that adiabaticity is satisfied for both optical polarizations, such a device would be insensitive to polarization of coupled modes and hence is operable to any one or both polarizations supported by the waveguide 102.

Figure 4:
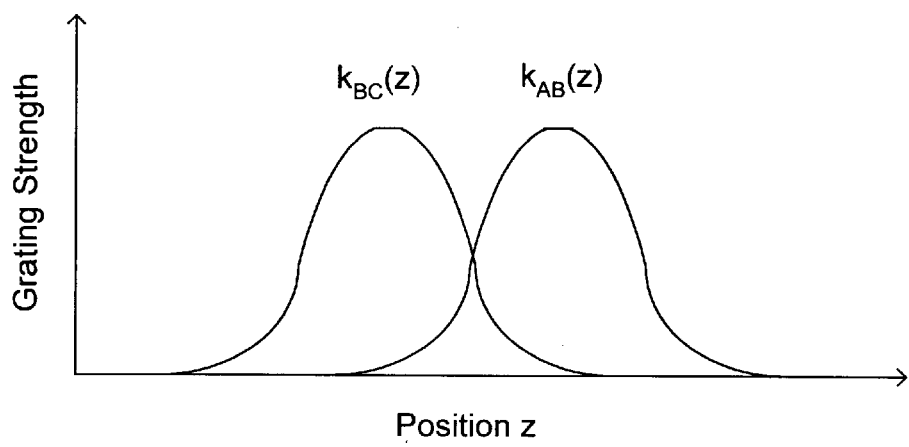
FIG. 4 shows an example of spatial profile of the gratings 104 and 106.

The above desired adiabaticity condition is given as follows. Assume the grating coupling coefficients of the two gratings 104 and 106 are $\kappa_{BC}$ and $\kappa_{AB}$, respectively. Many gratings have a periodic perturbation along a grating direction with a constant amplitude. For example, the spatial perturbation may be sinusoidal, $\kappa_{ij} \sin(2\Pi z/\Lambda_{ij})$ (i,j=A, B, C), where z is the position along the grating direction. The waveguide device 100 using such gratings operates under the non-adiabatic condition. The adiabaticity condition requires both gratings 104 and 106 have spatially varying amplitudes that gradually change along the grating direction in addition to the periodic perturbation. If the periodic perturbation is sinusoidal, the grating is $\kappa_{ij}$ (z)sine $2\Pi/\Lambda_{ij}$. One way to determine this desired condition is:

$$\left| \frac{\dot{\kappa}_{BC}}{\kappa_{BC}} - \frac{\dot{\kappa}_{AB}}{\kappa_{AB}} \right| \ll \left[ \kappa_{AB}^{2/3}\left(\frac{\kappa_{AB}}{\kappa_{BC}}\right)^{2/3} + \kappa_{BC}^{2/3}\left(\frac{\kappa_{BC}}{\kappa_{AB}}\right)^{2/3} \right]^{3/2}, \quad (6)$$

where $\dot{\kappa}_{AB}$, $\dot{\kappa}_{BC}$ are spatial derivatives of $\kappa_{AB}$ and $\kappa_{BC}$ along the grating direction. See, Peral and Yariv, *J. Lightwave Technol.*, supra. In general, this adiabatic condition requires that the grating amplitude is sufficiently high in the center of each grating and gradually decays towards both ends. Qualitatively, the waveguide device shown in FIG. 3 satisfies the adiabatic condition in Equation (6) when $\kappa_{AB}^2$ and $\kappa_{BC}^2$ are sufficiently large and the relative change with z is sufficiently smooth. But as the phase mismatching ($\delta_C = -2(\delta_{AB} - \delta_{CB})$) between modes A and C increases, the adiabaticity condition become more restrictive. FIG. 4 shows an example of spatial profile of the gratings 104 and 106.

The above adiabatic condition not only requires gradually changing the amplitude of each grating, but also requires a desired amount of spatial overlap between the two gratings 104 and 106. The latter is indicated by the denominator of the two terms on the left hand side of the Equation (6) which include either $\kappa_{AB}/\kappa B_C$ or $\kappa_{AB}/\kappa_{BC}$. Hence, at the center of each grating, the strength of the other grating cannot be too small (i.e., two gratings are too far apart), otherwise $\kappa_{AB}/\kappa_{BC}$ or $\kappa_{AB}/\kappa_{BC}$ would be too big to satisfy the adiabatic condition. The optimal separation of the gratings 104 and 106 for given spatial variations in $\kappa_{AB}$ and $\kappa_{BC}$ should a spacing that produces a maximum conversion efficiency between modes A and C under the adiabatic condition of the Equation (6). For example, if the spatial variations in $\kappa_{AB}$ and $\kappa_{BC}$ have Lorentizian shapes, a center of one grating is near the location when the grating amplitude of the other is at its half maximum value.

Figure 5:
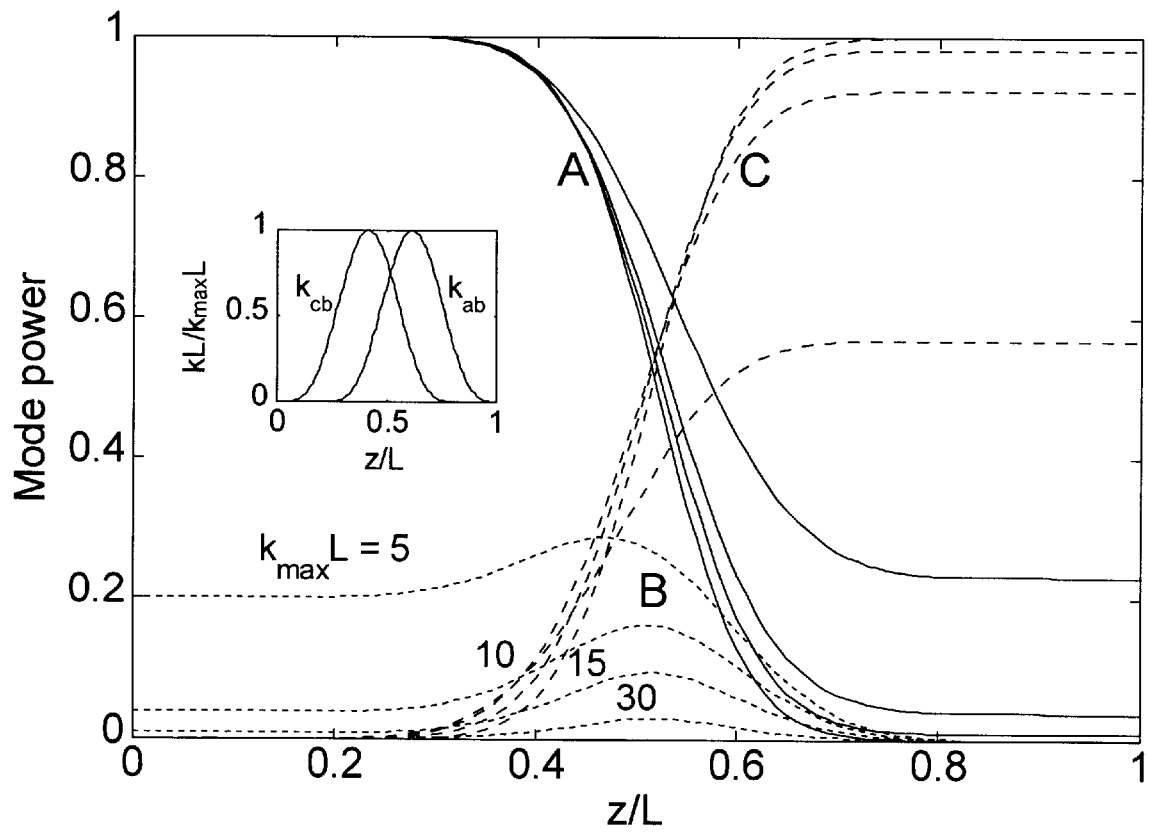
FIG. 5 shows the mode amplitudes as a function of the device length L of quasi-adiabatic Gaussian-shaped coupling coefficients for different coupling strength values at the center of each grating.

FIG. 5 shows the mode amplitudes as a function of the device length L of quasi-adiabatic Gaussian-shaped coupling coefficients for different coupling strength values at the center of each grating. The amplitude of the mode B decreases as the coupling strength at the center of each grating increases because the adiabaticity increases due to the increase of $\kappa_{AB}^2$ and $\kappa_{BC}^2$ while the terms of the left hand side of the Equation (6) remain substantially unchanged. Hence, under the adiabatic condition, the mediating mode B is hardly excited and any photon converted from the mode A into B by the grating 106 is immediately converted into the output mode C. It appears that the optical energy in the input mode A is directly converted into the copropagating output mode C.

Figure 6:
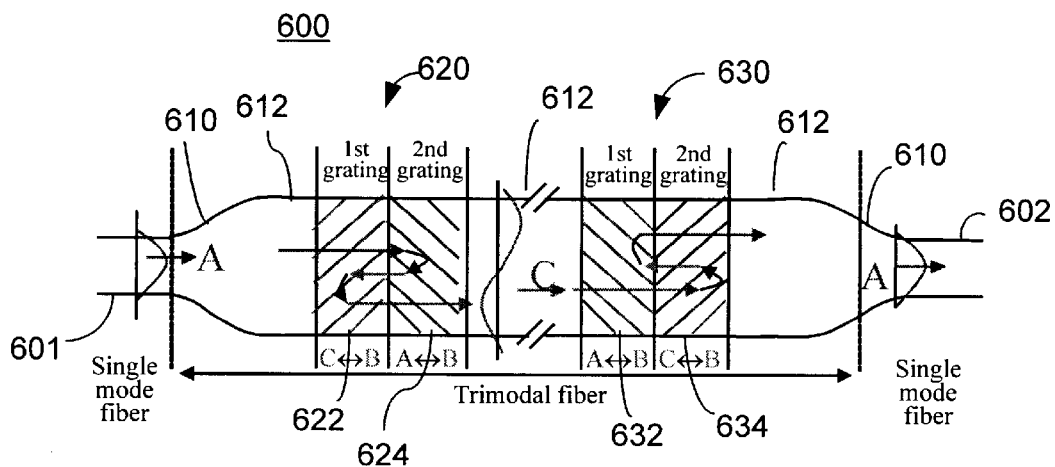
FIG. 6 shows one exemplary dispersion compensator for reducing dispersion in a single-mode waveguide based on any of the coupling devices shown in FIGS. 1–3.

One application of the above single-waveguide devices under either adiabatic condition or non-adiabatic condition may be used to compensate for dispersion. FIG. 6 shows one exemplary dispersion compensator 600 for reducing dispersion in a single-mode waveguide having two segments 601 and 602 for transmitting optical signals in a mode A. The compensator 600 includes a multi-mode waveguide 612 that supports at least three different modes A, B, and C. The waveguide 612 is optically coupled between the single-mode waveguides 601 and 602 by, e.g., two transition segments 610. Two converting regions 620 and 630 are formed in the waveguide 612 to respectively convert the mode A into the mode C and the mode C back into the mode A. The first converting region 620 includes a grating 622 for coupling counter-propagating modes B and C and another grating 624 for coupling counter-propagating modes B and A with the grating 622 being closer to the transition 610. The second converting region 620 includes a grating 632 for coupling counter-propagating modes A and B and another grating 634 for coupling counter-propagating modes B and C with the grating 634 being closer to another transition 610.

The mode C is specially selected to have an opposite dispersion in the waveguide 610 with respect to the dispersion of the mode A in the single-mode waveguide segments 601 and 602. The length of the waveguide 612 between the two converting regions 620 and 630 are set at a value $L_C$ according to the amount of dispersion in the received mode A in order to substantially cancel the dispersion. In operation, an optical signal in the mode A is received from the single-mode waveguide 601 and is converted into the mode C by the first converting region 620. The signal in the mode C propagates through the waveguide 612 to the second converting region 630 to generate an opposite dispersion so that signal in the mode C, when reaching the second converting region 630, is substantially free of dispersion. This dispersion-free signal is then converted from the mode C back to the mode A and continues to propagate in the signal-mode waveguide 602 to a desired location.

Such a dispersion compensator can be deployed in a fiber link to reduce its fiber dispersion. It is known that mode $LP_{11}$ in an optical fiber has strong dispersion with an opposite sign to that of the mode $LP_{01}$. Propagation in mode $LP_{11}$ along a short length of bimodal fiber can compensate for the dispersion caused by propagation in mode $LP_{01}$ along a much longer single mode fiber. This method of dispersion compensation is especially attractive because the amount of dispersion that is compensated can be controlled by changing the length of bimodal fiber. The input mode A may be the $LP_{01}$ mode and the mode C may be the $LP_{11}$ mode. A higher order mode, e.g. $LP_{21}$ or $LP_{02}$, can be used as the mediating mode B. Since any energy traveling in mode $LP_{01}$ originating from imperfections in the trimodal fiber will be strongly reflected by the mode converter, no modal dispersion is produced. To avoid loss of energy to higher order modes, the trimodal fiber used for the mode conversion to mode $LP_{11}$ can be adiabatically narrowed to bimodal fiber for propagation and then widened back to trimodal fiber for the mode conversion to mode $LP_{01}$.

Figure 7:
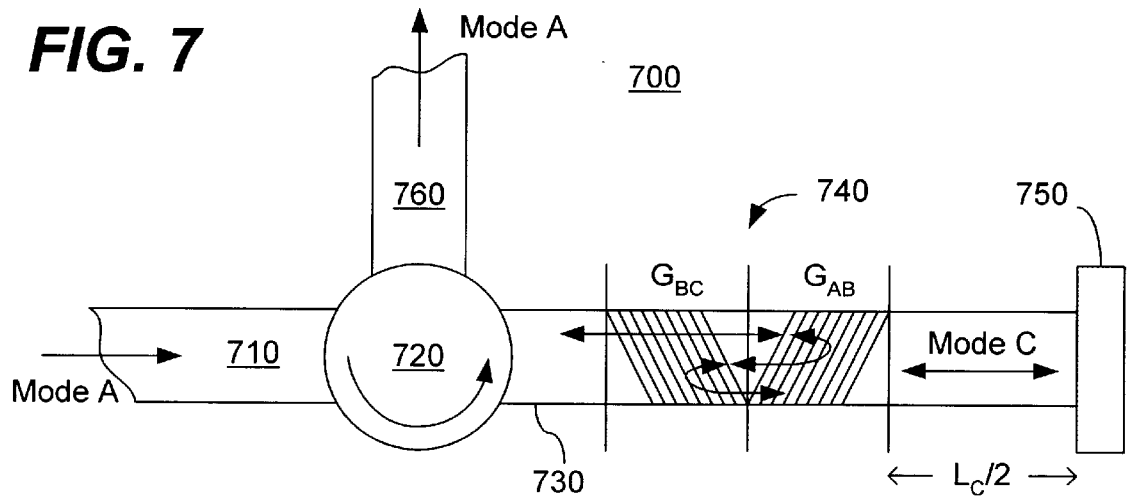
FIG. 7 shows another exemplary dispersion compensator for reducing dispersion in a single-mode waveguide based on any of the coupling devices shown in FIGS. 1–3.

FIG. 7 shows another exemplary dispersion compensator 700 for reducing dispersion. The compensator 700 uses a single converting region 740 in a "double pass" configuration. A single-mode fiber 710 for a mode A is coupled to an optical circulator 720 and then to a multi-mode fiber 730 having the converting region 740. The converting region 740 has two gratings to covert the mode A is converted into the mode C. The mode C propagates about one half of the length $L_C$ needed for dispersion compensation and is reflected back by a reflector 750. The reflected mode C is converted back to the mode A in the converting region with reduced dispersion. The circulator 720 then directs the reflected mode A to an output single-mode fiber 760.

Figure 8:
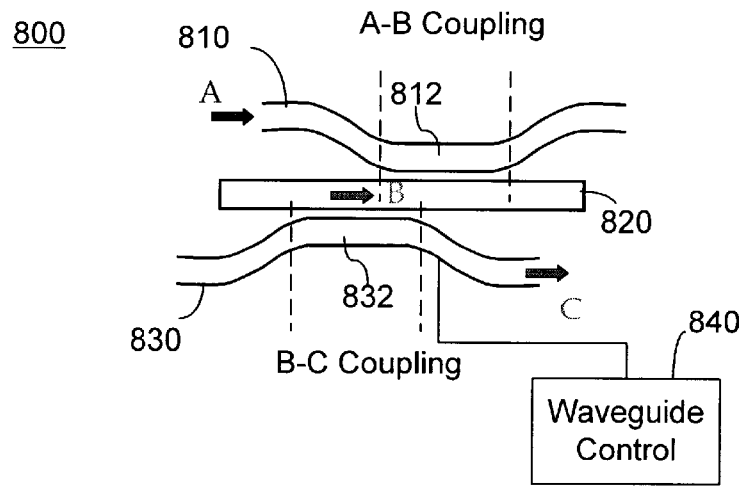
FIG. 8 shows one embodiment of a three-waveguide coupling device.

The mode conversion under the adiabatic condition implemented in a single-waveguide device shown in FIG. 3 may also be implemented by using evanescent wave coupling of different waveguides that are closely adjacent to one another. FIG. 8 shows an example of a 3-waveguide device 800 having an input waveguide 810 that supports the input mode A, an mediating waveguide 820 that supports a copropagating mediating mode B, and an output waveguide 830 that supports a copropagating output mode C. The waveguides 810, 820, and 830 may not be in the same plane. The input waveguide 810 has a coupling region 812 that is gradually bent toward a first portion of the mediating waveguide 820 and is sufficiently close to effect evanescent coupling to convert the mode A into the mode B. For example, the cores of the waveguides 810 and 820 in the coupling region 812 may be in a close proximity from each other by less than a few wavelengths. Similarly, a coupling region 832 in the output waveguide 830 is also bent toward a second portion of the mediating waveguide 820 to couple the mode B into the mode C by evanescent coupling. The two coupling regions 812 and 832 partially overlap with each other in such a way that the first coupling region 812 is spatially shifted from the second coupling region 832 along the propagating direction of the modes A and C. This is similar to the relative position of the two partially-overlapped gratings 106 and 104 in the single-waveguide device of FIG. 3 under the adiabatic condition. Different from the above single-waveguide devices, the mediating mode B here copropagates with the modes A and C. The waveguides 810, 820, and 830 may include optical fibers, coupled by the evanescent field that extends outside the fiber core.

In this 3-waveguide configuration, a high conversion efficiency between modes A and C can be achieved when the two coupling regions 812 and 832 satisfy the adiabatic condition of Equation (6) and the modes A and C are phase matched to have approximately the same propagation constant. Hence, the evanescent coupling should be strong and the bending of the coupling regions in the waveguides 812 and 832 should be gradual. No phase matching is required between the modes A and B, and between B and C. The propagation constant $\beta_B$ of the mode B can be very different from that of mode A or C, which may be achieved by using fibers with different core radius or step refractive index.

The phase matching between the modes A and C generally requires the input and output waveguides 810 and 830 are similarly or identically constructed. Therefore, energy transfer between modes A and C can be achieved in a broad bandwidth as long as these modes are supported by the input and output waveguides 810 and 830. Such a broadband device may be preferred over the single-waveguide devices of FIGS. 1–3 when a wide-band operation is necessary such as in a wavelength-division multiplexing fiber optical systems.

The device 800 may also be configured to operate in a narrow band configuration. In this case, the input and output waveguides 810 and 830 are different from each other. Hence, efficient energy transfer from the mode A to the mode B only occurs when the propagation constants of modes A and C are equal ($\beta_A \approx \beta_C$) at a specific wavelength.

In both broad band and narrow band configurations, the phase matching condition between the modes A and C of the waveguide device 800 may be used to effect optical switching with low insertion loss, low crosstalk and polarization insensitive operation. Optical switches are required in various applications such as optical routing, programmable delay lines and time-division multiplexing. The principle of operation is as follows. When modes A and C are phase-matched, efficient energy transfer occurs from the input mode A to the output mode C, irrespective of the propagation constant of mode B to a first order of approximation. When a small change in the propagation constant of modes A or C is introduced to break the phase matching condition, the coupling between A and C is spoiled and the signal in mode A, without coupling to the mode C in the output waveguide 830, will continue to propagate in the input waveguide 810. Hence, by controlling the phase matching condition, the signal in the mode A can be switched between the waveguides 810 and 830.

This optical switching device is implemented by adding a waveguide control 840 to the converting device 800 shown in FIG. 8. The waveguide control 840 may be coupled to one or both of the input and output waveguides 810 and 830 to change at least one parameter to break the phase matching condition in a controlled manner. For example, the waveguide control 840 may be used to change the index of refraction of the output waveguide 830 as shown. One implementation uses optical nonlinearities in the output waveguide 830, such as the Kerr-effect or the strong nonlinearity of doped fibers by changing the light intensity. An external pump beam at a different wavelength from the signal beam in the mode A may be coupled into the output waveguide 830 to generate this index change. The index of the output waveguide 830 may also be changed by mechanical compression or injecting an acoustic wave. Further, the output waveguide 830 may be designed to exhibit electro-optic effect, where the waveguide control 840 is an electro-optical device to use an external electrical field for optical switching.

The waveguide control 840 coupled to the output waveguide 830 as shown in FIG. 8 has a special advantage. Since there is no direct coupling between input and output modes A and C, the loss that accompanies the change in refractive index in the output waveguide 830, does not affect the input mode A. Hence, the uncoupled components in the input waveguide 810 continue to travel and remain unaffected.

Therefore, when the waveguides 810, 820, and 830 are formed of dissimilar waveguides, the device 800 may be used as a wavelength-selective coupler in a wavelength-division-multiplexed system to couple light from one waveguide to another over a specific wavelength band while leaving the rest of the spectrum unaffected. Some of these include wavelength-division-multiplexing of the transmission bands at 1310 nm and 1550 nm, and demultiplexers of pump and signal waves for erbium-doped fiber amplifiers. The refractive index profile and waveguide dimensions of the dissimilar waveguides 810, 820, and 830 can be chosen so that waveguide A and C are only phase-matched at a band of interest. Outside this band, waveguides A and C are not phase-matched and hence no coupling occurs, leaving the input mode unaffected. This device has low polarization sensitivity, low cross-talk and good coupling efficiency.

Although only a few embodiments are described, various modifications and enhancements may be made without departing from the spirit of the following claims.

What is claimed is:

1. An optical waveguide device, comprising:
    a first optical terminal to receive optical energy in a first waveguide mode;
    a first wave-coupling region structured to couple at least a portion of said first waveguide mode into a second waveguide mode that is different from said first waveguide mode;
    a second wave-coupling region structured to couple said second waveguide mode into a third waveguide mode which copropagates with said first waveguide mode; and
    a second optical terminal coupled to said second wave-coupling region to output optical energy in said third waveguide mode, wherein said first and third waveguide modes have a phase matching condition with respect to each other.

2. A device as in claim 1, wherein said first and second optical terminals are formed by two terminals of a single waveguide which supports at least said first, second, and third waveguide modes, and said first and second wave-coupling regions respectively have a first grating formed along said waveguide close to said second optical terminal and a second grating formed along said waveguide close to said first optical terminal, and
    wherein said first grating is configured to reflect said first waveguide mode into said second waveguide mode that counter propagates with said first waveguide mode and to transmit said third waveguide mode, and said second grating is configured to reflect said second waveguide mode into said third waveguide mode and to transmit said first waveguide mode.

3. A device as in claim 2, wherein propagation constants of said first and third waveguide modes have a phase matching relation that is associated with grating periods of said first and second gratings.

4. A device as in claim 2, wherein said first and second gratings are spatially separated from each other.

5. A device as in claim 4, wherein said first and second waveguide modes satisfies a first Bragg phase matching condition at said first grating, and said second and third waveguide modes satisfies a second Bragg phase matching condition at said second grating.

6. A device as in claim 2, wherein said first and second gratings partially overlap each other.

7. A device as in claim 2, wherein at least one of said first and second gratings has a grating strength that is substantially constant along said waveguide.

8. A device as in claim 2, wherein said first and second gratings partially overlap each other and each grating has a grating strength that gradually changes along said waveguide according to an adiabatic condition.

9. A device as in claim 2, wherein each grating is sufficiently long along said waveguide to couple energy from said first waveguide mode to said third waveguide mode in two different polarization directions.

10. A device as in claim 1, wherein said first and second wave-coupling regions partially overlap each other, and wherein coupling between said first and second waveguide modes of said first wave-coupling region and coupling between said second and third waveguide modes of said second wave-coupling region spatially change in a gradual manner according to an adiabatic condition.

11. A device as in claim 10, wherein said first and second waveguide modes have a phase mismatch with respect to each other.

12. A device as in claim 10, wherein said second and third waveguide modes have a phase mismatch with respect to each other.

13. An optical waveguide device, comprising:
a first optical terminal to receive optical energy in a first waveguide mode;
a first wave-coupling region structured to couple at least a portion of said first waveguide mode into a second waveguide mode that is different from said first waveguide mode;
a second wave-coupling region structured to couple said second waveguide mode into a third waveguide mode which copropagates with said first waveguide mode; and
a second optical terminal coupled to said second wave-coupling region to output optical energy in said third waveguide mode;
a first waveguide structured to support said first waveguide mode and having an input as said first optical terminal;
a second waveguide structured to support said second waveguide mode that copropagates with said first waveguide mode; and
a third waveguide structured to support said third waveguide mode and having an output as said second optical terminal, said third and first waveguide modes being phase matched to have propagation constants that are substantially equal to each other,
wherein said first waveguide has a segment close to a first portion of said second waveguide to allow evanescent coupling therebetween to form said first wave-coupling region and said third waveguide has a segment close to a second portion of said second waveguide to allow evanescent coupling therebetween to form said second wave-coupling region.

14. A device as in claim 13, wherein said first and second portions in said second waveguide partially overlap each other and said first portion is closer to said second optical terminal than said second portion.

15. A device as in claim 13, wherein said second waveguide is different from said first and third waveguides.

16. A device as in claim 13, wherein said first and third waveguides are substantially identical to each other and are operable to couple optical energy at different wavelengths that are supported by said first and third waveguides.

17. An optical waveguide device, comprising a waveguide structured to support at least first, second, and third waveguide modes, said waveguide including:
a first grating operable to couple one mode of said first and second modes into the other mode which counter propagates with said one mode while being transmissive to said third mode and other modes; and
a second grating operable to couple one mode of said second and third modes into the other mode which counter propagates with said one mode while being transmissive to said first mode and other modes, said second grating positioned relative to said first grating so that an optical wave in said second mode, if generated from one of said first and second gratings by converting a transmitted wave from the other grating, propagates towards at least a portion of the other grating to effect energy transfer between copropagating optical waves respectively in said first and third modes,
wherein said first and second gratings are spatially separated from each other, and wherein said first grating is structured to satisfy a first Bragg phase matching condition for coupling between said first and second modes, and second grating is structured to satisfy a second Bragg phase matching condition for coupling between said second and third modes.

18. A device as in claim 17, wherein at least one of said first and second gratings has a grating strength that is substantially constant along said waveguide.

19. An optical waveguide device, comprising a waveguide structured to support at least first, second, and third waveguide modes, said waveguide including:
a first grating operable to couple one mode of said first and second modes into the other mode which counter propagates with said one mode while being transmissive to said third mode and other modes; and
a second grating operable to couple one mode of said second and third modes into the other mode which counter propagates with said one mode while being transmissive to said first mode and other modes, said second grating positioned relative to said first grating so that an optical wave in said second mode, if generated from one of said first and second gratings by converting a transmitted wave from the other grating, propagates towards at least a portion of the other grating to effect energy transfer between copropagating optical waves respectively in said first and third modes,
wherein said first and second gratings partially overlap each other.

20. A device as in claim 19, wherein each grating has a grating strength that gradually changes along said waveguide according to an adiabatic condition.

21. A device as in claim 20, wherein said first grating is structured to have a first phase mismatch between said first and second modes and said second grating is structured to have a second phase mismatch between said second and third modes that is substantially identical to said first phase mismatch.

22. A device as in claim 20, wherein said first and third modes are phase matched with each other to effect an efficient coupling therebetween.

23. A device as in claim 17, wherein said waveguide is configured in a way that said first mode and said third mode have opposite dispersions in said waveguide.

24. A device as in claim 23, wherein said waveguide includes:
a first mode-converting region, which includes said first and second gratings, to convert an optical wave in said first mode into said third mode;
a dispersion-compensating segment coupled to receive said optical wave in said third mode from said first mode-converting region and configured to produce a desired amount of dispersion in said optical wave that cancels at least a portion of a dispersion in said optical wave in said first mode; and
a second mode-converting region adjacent to said dispersion-compensating segment to receive said optical wave and having another pair of gratings substantially identical to said first and second gratings, said another pair of gratings arranged to convert said optical wave in said third mode into said first mode.

25. A device as in claim 23, wherein said waveguide includes a dispersion-compensating segment having a first end coupled to receive an optical wave in said third mode from said second grating and a second end at a predetermined length from said first end to produce a desired amount of dispersion in said optical wave, further comprising a reflector coupled to said second end of said segment and operable to reflect said optical wave back in said segment toward said second grating.

26. A device as in claim 17, wherein said first and second gratings are sufficiently long to effect energy transfer between said first and third modes in two different polarization directions.

27. An optical waveguide device, comprising:
a first waveguide structured to support a first waveguide mode;
a second waveguide structured to support a second waveguide mode that copropagates with said first waveguide mode, wherein said first waveguide has a coupling segment gradually bent towards a first portion of said second waveguide in a close proximity to allow evanescent coupling therebetween; and
a third waveguide structured to support a third waveguide mode that copropagates with said first waveguide mode and has a propagation constant substantially equal to a propagation constant of said first mode, wherein said third waveguide has a coupling segment that is bent towards a second portion of said second waveguide that partially overlaps said first portion to allow evanescent coupling.

28. A device as in claim 27, wherein said first and second waveguides are substantially identical to each other to couple optical energy at a plurality of wavelengths between said first and third waveguides.

29. A device as in claim 27, wherein said first and second waveguides are substantially different from each other to couple optical energy only at a selected wavelength between said first and third waveguides.

30. A device as in claim 29, wherein said first waveguide is configured to carry an optical wave having a plurality of spectral components at different wavelengths, wherein said third waveguide is configured to phase match said third mode with only one of said spectral components so that said one spectral component is coupled to said third waveguide while other spectral components continue to propagate in said first waveguide.

31. A device as in claim 27, wherein said first and second portions of said second waveguide are configured to be sufficiently long to effect sufficient energy transfer between said first and third modes in two different polarization directions.

32. A device as in claim 27, further comprising a waveguide control device coupled to said third waveguide, operable to control a property of said third waveguide so that energy in said first waveguide is coupled to said third waveguide only when said property is controlled to phase match said third mode to said first mode.

33. A device as in claim 32, wherein said property is an index of refraction of said third waveguide.

34. A device as in claim 33, wherein said index of refraction of said third waveguide is controlled by a non-linear optical effect.

35. A device as in claim 33, wherein said index of refraction of said third waveguide is controlled by a mechanical effect.

36. A device as in claim 33, wherein said index of refraction of said third waveguide is controlled by an electro-optical effect.

37. A method for coupling optical energy from one waveguide mode into another copropagating mode in an optical waveguide device, comprising:
transmitting optical energy in a first waveguide mode supported by a waveguide device;
coupling said optical energy in said first waveguide mode into a mediating waveguide mode in a first coupling region within said waveguide device; and
coupling said optical energy in said mediating waveguide mode into a second waveguide mode in a second coupling region within said waveguide device, wherein said first and third waveguide modes have a phase matching condition with respect to each other.

38. A method as in claim 37, wherein said first and second coupling regions are spatially separated from each other, and further comprising:
phase matching said first waveguide mode to said mediating mode; and
phase matching said second waveguide mode to said mediating mode.

39. A method as in claim 37, wherein said first and second coupling regions partially overlap each other.

* * * * *